W. H. McLAUGHLIN & R. E. BABCOCK.
CONNECTING DEVICE.
APPLICATION FILED AUG. 30, 1917.
1,260,419.
Patented Mar. 26, 1918.
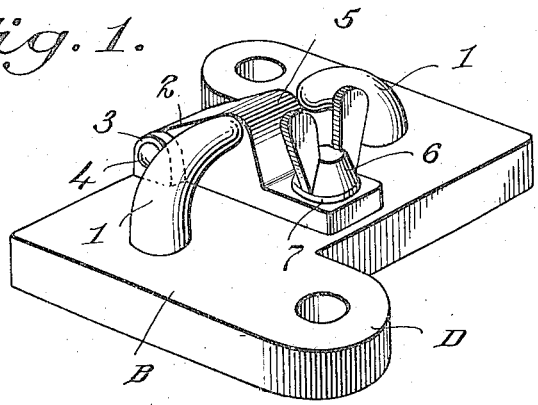
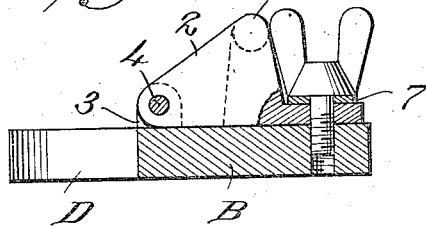
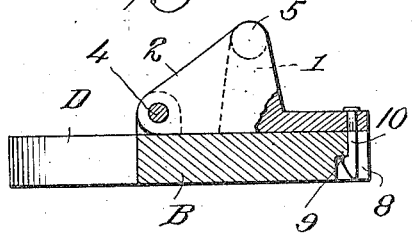
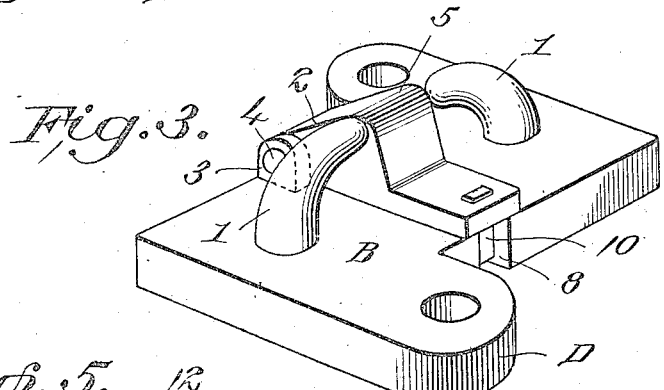
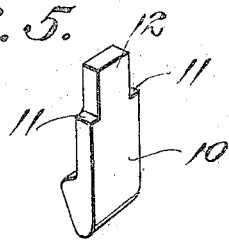
Inventors
William H. McLaughlin,
Richard E. Babcock,
By Wm H Babcock & Son
Attorneys

UNITED STATES PATENT OFFICE.

WILLIAM H. McLAUGHLIN, OF HARTFORD, CONNECTICUT, AND RICHARD E. BABCOCK, OF BARCROFT, VIRGINIA, ASSIGNORS, BY DIRECT AND MESNE ASSIGNMENTS, TO CASSIUS S. CHASE, OF HARTFORD, CONNECTICUT.

CONNECTING DEVICE.

1,260,419.  Specification of Letters Patent.  Patented Mar. 26, 1918.

Application filed August 30, 1917. Serial No. 189,006.

*To all whom it may concern:*

Be it known that we, WILLIAM H. McLAUGHLIN and RICHARD E. BABCOCK, citizens of the United States, residing, respectively, at Hartford, in the county of Hartford and State of Connecticut, and at Barcroft, in the county of Alexandria and State of Virginia, have invented certain new and useful Improvements in Connecting Devices, of which the following is a specification.

This invention relates to connecting devices of the plate type having two or more preferably integral hooks and resides especially in the means or guard for closing the opening between the free ends of said hooks against the egress or ingress of the links of a chain or part or parts of some element or elements, and in provision for locking said means in position.

The invention hereinafter set forth and described is in the form of a plate intended primarily by applicants to be secured to the inner face of the periphery of a truck wheel felly for use in attaching anti-skidding chains, of the fixed point type, thereto. However, the invention may be embodied in a number of other different forms of plates to be fixed in position in various manners. Likewise, while primarily intended for use with anti-skidding devices, as above mentioned, it can be used equally well for a great variety of purposes.

The object of the present invention is to provide a plate with two hooks or projections to receive the links of a chain and a coöperating pivoted keeper or guard adapted to be locked in position between the adjacent ends of said hooks to close the opening between said hooks against the egress or ingress of said chain links to prevent the removal from, or application to, said hooks of a chain link when said keeper or guard is in normal position.

Further objects are to provide a simple construction whereby said keeper or guard may be pivotally mounted on said plate, have pivotal movement in a plane transverse to said hooks and be easily, quickly and securely locked in normal position.

Further objects are to reduce the cost of manufacture, simplify the construction and increase the reliability and durability of such articles, all of which objects are accomplished by the construction, combination and arrangement of parts all as hereinafter more particularly set forth and described.

In the accompanying drawings, in which only the preferred form is shown:

Figure 1 represents a perspective view of a connecting device embodying our invention;

Fig. 2, a cross-sectional view through the plate showing the guard partly in side elevation and partly in section, the locking screw being shown in side elevation and one of the hooks being indicated in dotted lines;

Fig. 3, a view, similar to Fig. 1, of a modified form wherein a spring catch or lock is substituted for the locking screw;

Fig. 4, a view, similar to Fig. 2, of the modified form; and

Fig. 5, a detail perspective view of the spring catch of lock used in the modified form.

Referring now in detail to the drawings B indicates a plate having perforated offset flanges D, two in number and arranged on opposite sides of the respective end portions of said plate, for the reception of any suitable anchoring or securing means, not shown, to hold said plate immovably to some object.

This plate B is provided with two hooks 1 presented toward and in line with each other and preferably, though not necessarily, integral with said plate. The adjacent or free ends of the hooks 1 are at an interval from each other, leaving an opening, to allow the ready application and removal of chain links to and from said hooks.

Preferably formed integral with said plate B are two perforated lugs 3 arranged to one side of the hooks 1, in which lugs, or between which lugs the guard 2 is pivotally mounted by a pivot pin 4 passing through the perforation in one of said lugs, through the corresponding perforation in said guard 2 and finally through the perforation in the remaining lug 3. This guard 2 has a portion 5 which in normal position extends from the face of the plate B flush with the outer faces of the adjacent free ends of the hooks 1 and is of sufficient thickness to nearly fill the interval between the adjacent ends of said hooks, just leaving sufficient room or clearance for its free and unhampered pivotal movement, thus in normal position closing the opening between the adjacent ends of said hooks against the egress or ingress of chain links and preventing the application or removal of chain links to or from either of said hooks.

The free end portion of this guard is flattened and perforated to receive a thumb screw 6 turning into a screw-tap in said plate B registering with said perforation when the guard 2 is in normal position, to lock the latter in such position.

A split spring or locking washer 7, of the usual well known form, slipped over the end of the screw 6 before it is passed through the perforation in guard 2 will act on the opposing faces of the head of screw 6 and plate B to prevent said screw 6 from being jarred loose.

To release the guard it is only necessary to unscrew screw 6 until it is free of the threads in plate B, when guard 2 may be turned on its pivot to allow free access to the ends of the hooks 1.

In the modified form shown in Figs. 3, 4 and 5, the screw 6, washer 7, screw tap in plate B and perforation in guard 2 are dispensed with, the side of plate B adjacent the free end of said guard 2 being provided with a shouldered recess 8, the shoulder 9 formed thereby being engaged by the spring catch or lock 10 which is mounted in the free end of said guard 2. This spring catch or lock 10 has shoulders 11 which engage the under face of said guard 2 while the reduced portion or stem 12 extends through a perforation in said guard 2 and is upset and riveted down on the upper face of said guard 2 to hold said spring catch or lock 10 securely in place.

The head or engaging face of this catch or lock 10 is slightly rounded so as to force the guard 2 securely down in position, riding over the sharp corner of shoulder 9, and to permit the guard 2 to be turned back on its pivot by applying sufficient force to cause the rounded face of the head of said catch or lock to ride out over and free of the shoulder 9.

The guard 2 may well be of cast metal.

Any suitable material may be used for any part.

Having thus described our invention, what we claim as new and desire to secure by Letters Patent is:

A connecting device consisting of a base-plate adapted to be rigidly held in position on some relatively fixed object and provided with two hooks, the free ends of which are adjacent each other, in combination with a guard pivotally mounted on said plate and adapted to be turned on its pivot to lie between the adjacent free ends of said hooks to prevent the application or removal of a chain link to or from either of said hooks, and means for locking said guard in such position.

WILLIAM H. McLAUGHLIN.
RICHARD E. BABCOCK.

Copies of this patent may be obtained for five cents each, by addressing the "Commissioner of Patents. Washington, D. C."